United States Patent [19]
Vogl et al.

[11] Patent Number: 5,978,458
[45] Date of Patent: Nov. 2, 1999

[54] MAGNETIC PAY TELEPHONE CASH BOX PROXIMITY SWITCH

[75] Inventors: Allen Vogl, St. Cloud, Fla.; Glenn Arche, Duluth; Jack Seay, Gainesville, both of Ga.; John MacNeill, Indialantic, Fla.

[73] Assignee: Technology Service Group, Inc., Roswell, Ga.

[21] Appl. No.: 08/904,628

[22] Filed: Aug. 1, 1997

[51] Int. Cl.$^6$ .................................................. H04M 17/00
[52] U.S. Cl. ..................... 379/143; 379/145; 340/568; 194/239
[58] Field of Search .................................... 379/143, 144, 379/145, 146, 147, 148, 149, 150, 151, 152, 153, 154; 194/210, 211, 239, 322; 232/7, 9; 340/547, 551, 568

[56] References Cited

U.S. PATENT DOCUMENTS

| 4,536,754 | 8/1985 | Holce et al. ......................... 340/568.4 |
| 4,864,087 | 9/1989 | Yu-Hua Chen .......................... 340/547 |
| 4,928,299 | 5/1990 | Tansky et al. ........................... 379/143 |
| 5,754,109 | 5/1998 | Deutsch .................................. 379/145 |
| 5,896,446 | 4/1999 | Sagady et al. ........................... 379/146 |

Primary Examiner—Curtis A. Kuntz
Assistant Examiner—Rexford N. Barnie
Attorney, Agent, or Firm—T. Daniel Christenbury

[57] ABSTRACT

A cash box proximity switch arrangement is provided for public telephones and is mounted in an upper portion of a lower housing of the telephone above the vault area. The switch is contained in a sealed housing which prevents contamination from dirt, moisture and the like. A magnet can be arranged so as to provide a bi-stable magnetic circuit between the floor of the lower phone housing and a cash box lid attached to a cash box which has been installed in the vault area of the telephone housing.

15 Claims, 9 Drawing Sheets

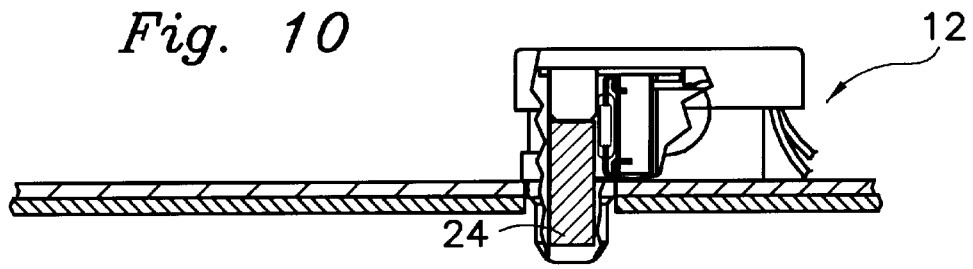
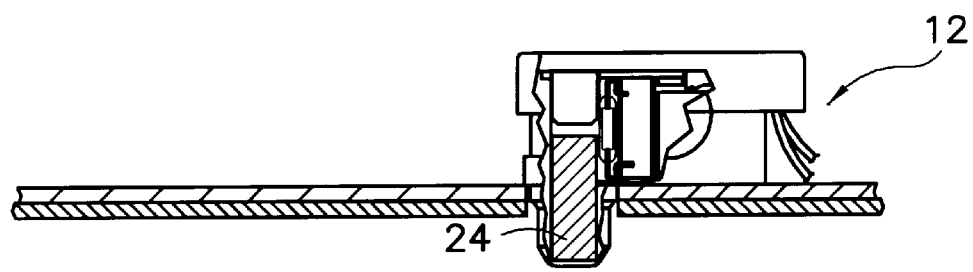
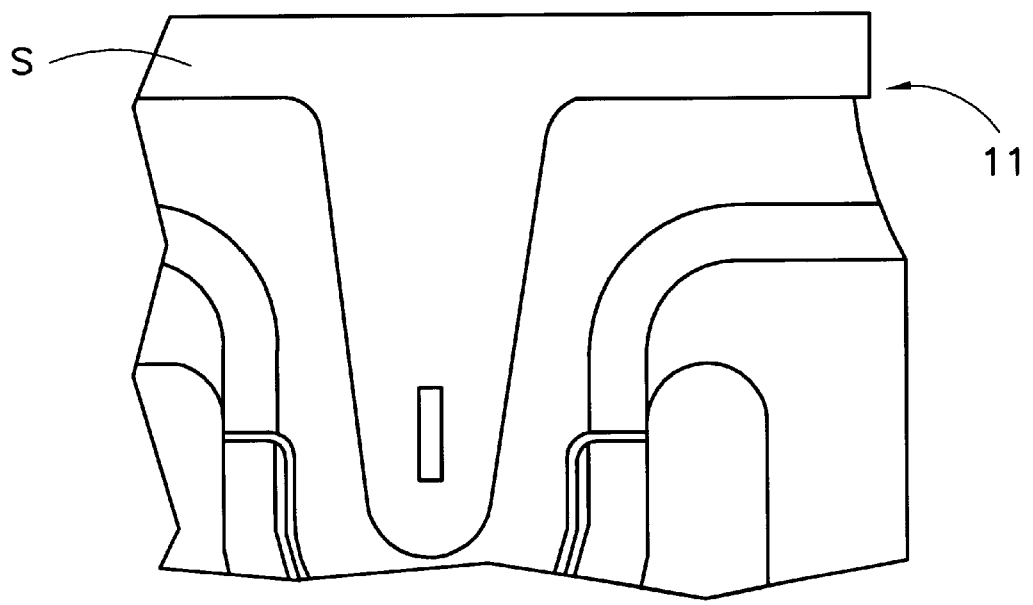

5,978,458

MAGNETIC PAY TELEPHONE CASH BOX PROXIMITY SWITCH

BACKGROUND AND SUMMARY OF THE INVENTION

The present invention relates to a public or pay telephone magnetic cash box switch configured to be mounted in an upper portion of the lower phone housing directly above the phone's vault area.

Conventional cash box switch arrangements are designed to detect the presence of the cash box either through mechanical or optical methods. These switches generally require the removal of the vault door and cash box for installation. For example, the arrangement in FIG. 1 is placed in the bottom of the vault area and uses an L-shaped arm to open and close a switch where the L-shaped arm is acted upon by the cash box. Such arrangements are both relatively delicate and are also relatively difficult to install.

We have recognized that the conventional switches possess other substantial disadvantages, chief among them being cost, unreliability due to fragile moving parts, susceptibility to tampering and corrosion, and temperature sensitivity. In the case of optical switches, interface electronics and/or a special chassis are required. Moreover, optical switches are affected by the physical condition of the cash box lid resulting from corrosion, dust, dirt, airborne contaminants and the like.

It is an object of the present invention to provide a low-cost magnetic cash box proximity switch which greatly simplifies installation, i.e., a switch which does not physically contact the cash box and which does not require the removal of the vault door and the cash box.

It is yet a further object of the present invention to allow for the switch to be installed by technicians who would normally not have keys which provide access to the vault area and cash box.

It is a still further object of the present invention to provide a cash box switch which utilizes non-contact magnetic techniques rather than the more conventional mechanical and optical methods so as to provide a relatively uncomplicated, reliable configuration.

In addition to being easily installed and reliable, the switch according to the present invention has the advantage of being tamper-proof, sealed and eliminating a need for power consumption.

Other advantageous features of the switch according to the present invention include a completely passive system which does not require any interface electronics or a special chassis, elimination of all moving parts except for a magnet, a switch which is downwardly compatible in place of a mechanical cash box switch, and a switch which can be retrofitted for use in existing 1D-style phone housings but can also be adapted to fit in 2D-style panel phone housing.

The foregoing objects and advantages have been achieved by providing a public telephone cash box switch using a magnet which is mountable in the portion of the lower housing directly above the phone's vault area. That is, the magnetic switch utilizes a bi-stable magnetic circuit in which the lower pole of the magnet is attracted to the phone housing with no cash box present and to the cash box lid when the cash box is installed. Proximity sensing avoids physical contact between the switch arrangement and the cash box lid.

More specifically, in a currently preferred embodiment, the switch arrangement includes a cap and a lower body containing a vertically oriented sealed reed switch and corresponding magnet for effecting the electrical switching function in which the corresponding magnet has a vertical travel of 0.050 inch. The magnet can be a Neodymium rare earth permanent magnet grade such as 33H with the distance between the reed switch contacts and the magnet chosen to minimize hysteresis in the operation of the reed switch.

The switch housing can be molded from a plastic or other suitable non-ferrous material selected for minimum friction, temperature stability, and moisture and humidity resistance. The housing unit is configured to be sealed with a compressible molded elastomer gasket to prevent dirt and moisture intrusion. The unit can be assembled with one or more screws or snapped together with interference fit posts and bores.

A flex circuit can be utilized for mounting the reed switch and making the electric connection to the wires while positioning and precisely retaining the reed switch within the switch housing. The above-mentioned elastomer sealing gasket can also be used to apply pressure to the top formed lead of the reed switch to assure its proper location within the housing.

BRIEF DESCRIPTION OF THE DRAWINGS

These and other objects, features and advantages of the present invention will become more readily apparent from the following detailed description thereof when taken in conjunction with the accompanying drawings wherein:

FIG. 9 is an elevational view of the magnetic cash box switch installed in the public telephone with the cash box present in the vault similar to FIG. 4;

FIG. 10 is a view similar to FIG. 9 but with the cash box removed from the vault similar to FIG. 6;

DETAILED DESCRIPTION OF THE DRAWINGS

Figure 1:
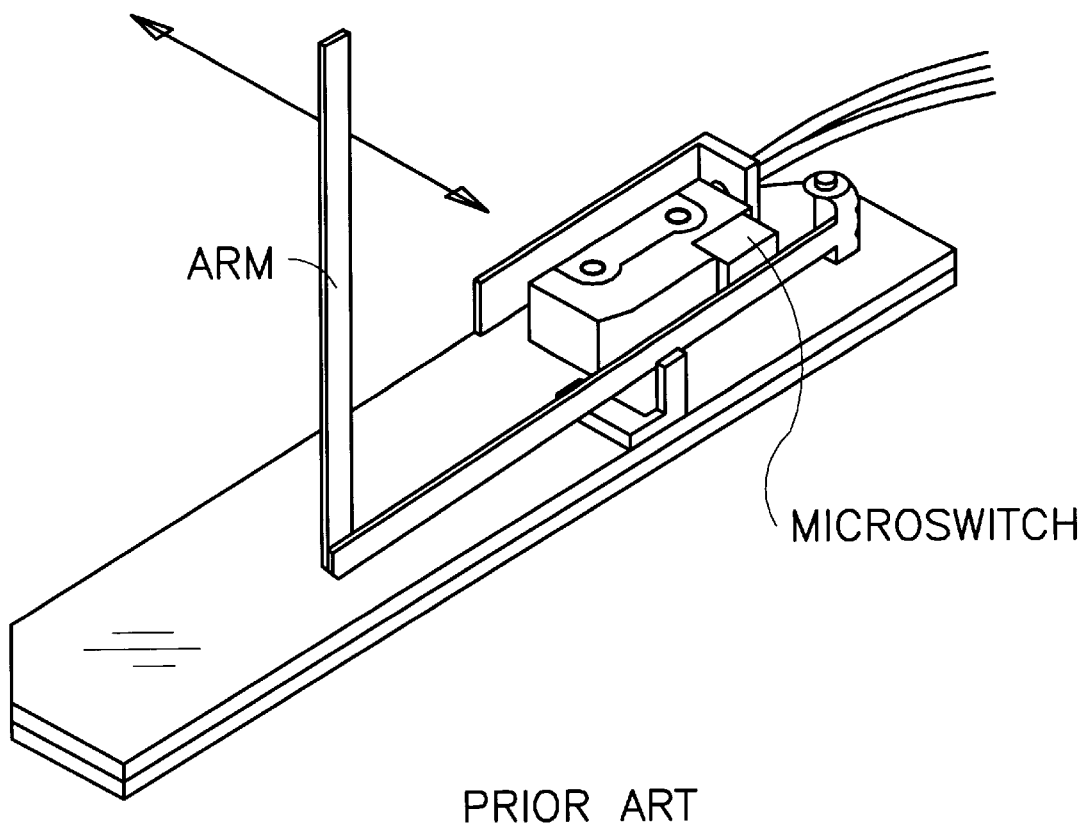
FIG. 1 is a perspective view of the above-described prior art mechanical cash box switch.
Figure 2:
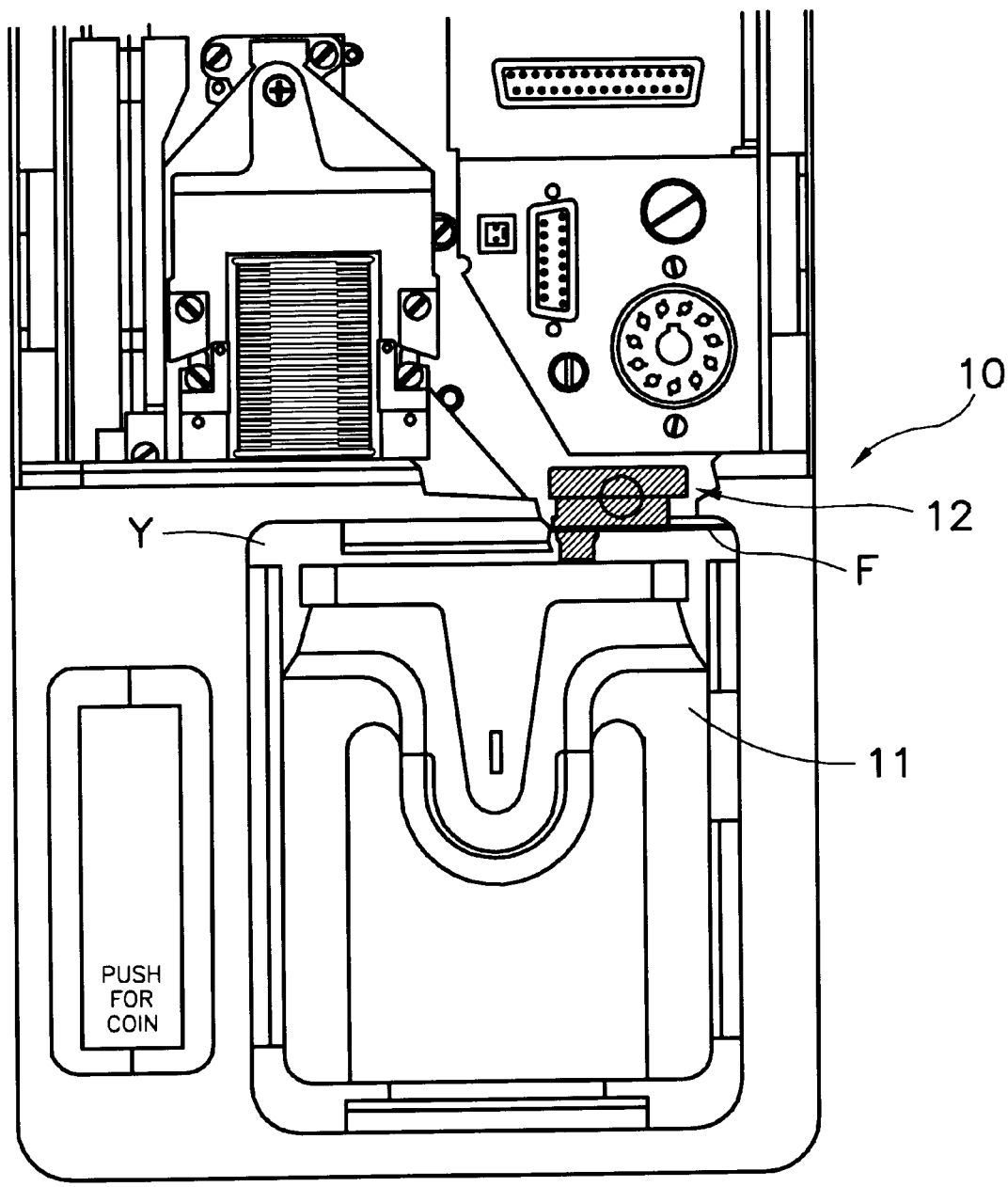
FIG. 2 is a partial front elevational view of a public telephone with a portion of the lower housing structure and upper housing cover removed to show a currently preferred embodiment of an installed magnetic cash box switch using a magnet in accordance with the present invention.

Referring now to the drawings and, in particular, to FIG. 2, a lower portion of a lower housing of a 1D-style public telephone is designated generally by the numeral 10. A portion of the lower housing structure and upper housing cover has been removed to illustrate the location of the magnetic cash box switch of the present invention designated generally by the numeral 12 on the floor F separating the upper portion of the lower housing from the vault area V as well as the conventional coin return slot in relation to a metal cash box 11 located in the vault area V. It will be understood, of course, that the conventional vault door which prevents unauthorized access to the cash box 11 has been removed for illustrating the cash box 11 within the vault area V.

Referring now to FIGS. 3 through 5 and 14, the magnetic cash box switch arrangement 12 is comprised of a housing unit constructed in two parts, namely cap 13 and body 14 which are joined together by, for example, a screw 15. A cover piece 41 made of flexible material or the like and provided with adhesive can be used to cover the screw 15, thereby improving the cosmetics and also providing a space for data such as part number and manufacturer. A contemplated alternative method of joining the cap 13 and body 14 is through an interference fit between, on one hand, cylindrical portions 13', 13", depending from the cap 13 and, on the other hand, bores 18, 18', in the body 14.

Figure 14:
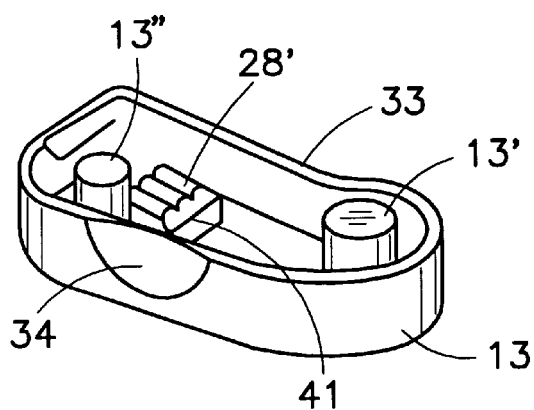
FIG. 14 is an isolated perspective view of the cap shown in FIG. 3 but turned over to see the interior details thereof.

As best seen in FIG. 14, the cap 13 has a peripheral thin-walled lip 33, with a finger-grip portion 34, to accommodate the body 14 therein. That is, the cap 13 functions as a cover to shed water entering the phone housing and preventing unwanted moisture from entering the interior between the cap 13 and the body 14. An elastomeric gasket 16 has an outer perimeter which is complementary to the shape of the cap 13 and the body 14, and is placed between them during assembly to provide both a moistureproof barrier and for the reason described below.

The body 14 has a cylindrical portion 17 for the blind bore 18 therein as well as a U-shaped vertically oriented cavity 19 to accommodate a conventional glass sealed magnetic reed switch 20 with magnetic contacts. The cavity 19 communicates with a contiguous larger cavity 21 which accommodates a rectangular flexible printed circuit 22 made from Kapton or other suitable material which is formed into a U-shaped configuration and slid into the cavity 21 during assembly. The conductive circuit elements contained within the flexible printed circuit 22 provide the electrical connection between the reed switch 20 and the lead-out wires 23 to the phone electronics in the phone housing. This arrangement of the reed switch 20, the flexible circuit 22 and the lead-out wires 23 forms a flex circuit assembly for mounting the reed switch 20 and for making the electrical connection via a standard plug P.

Figure 4:
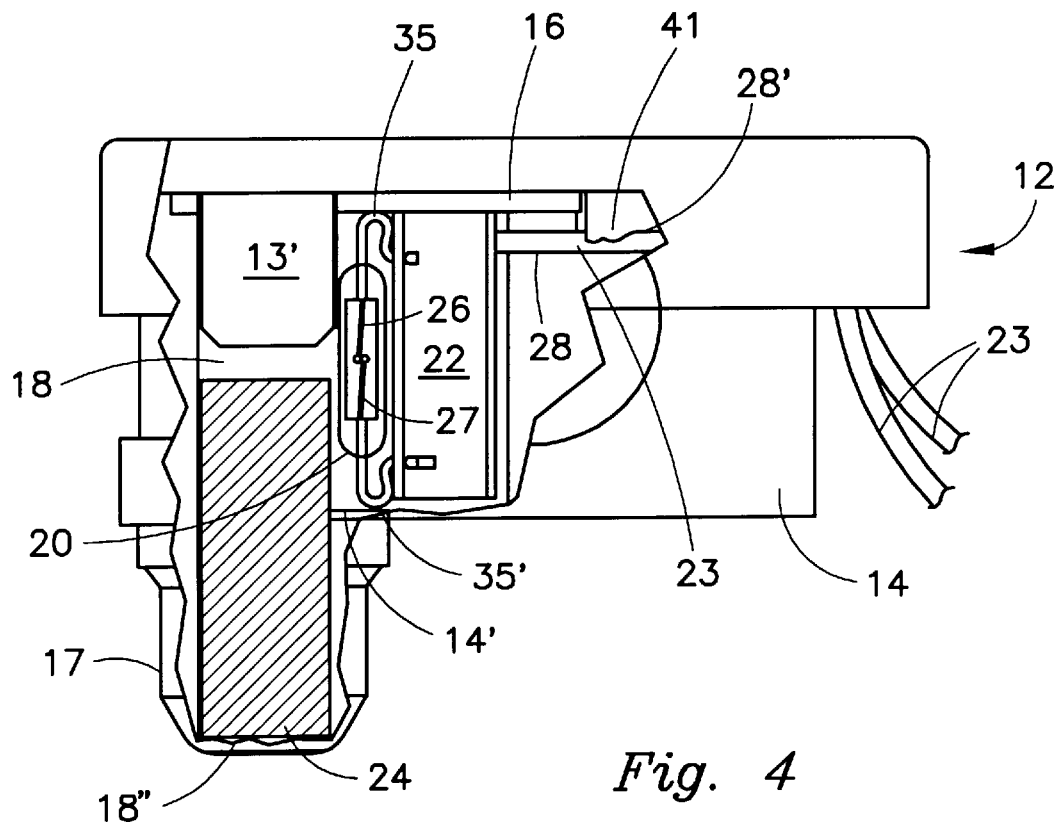
FIG. 4 is a cross-sectional, front elevation view of the magnetic cash box switch shown in FIG. 2 with the reed switch contacts open and the magnet in a lower position assumed when the cash box is inserted into the vault.
Figure 5:
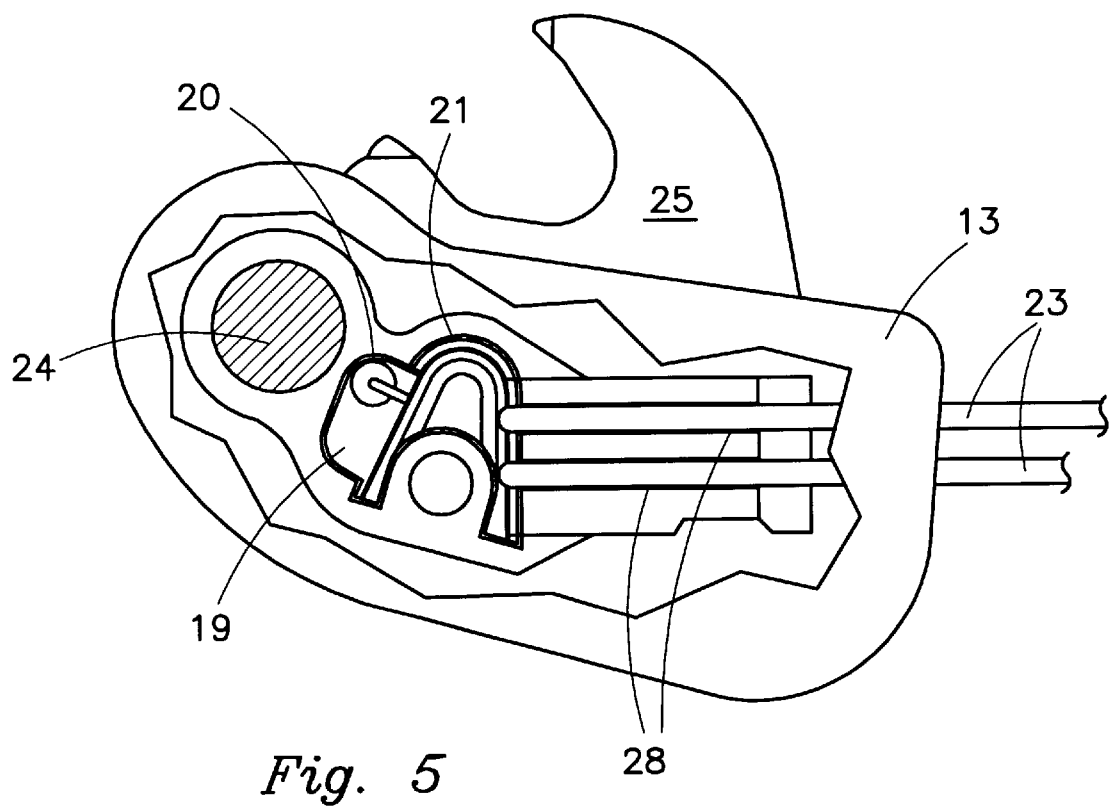
FIG. 5 is a plan view of the switch shown in FIG. 4 but with a portion of the cap removed to show interior features.

In addition, the legs of the flexible circuit 22, once formed into the U-shaped configuration, are moved toward one another during assembly into the cavity 21 and thus have a tendency to bias outwardly after assembly. Thereby, the flex circuit assembly also positions and retains the reed switch 20 precisely within the cavity 19 in the body 14. The flexible circuit assembly in combination with molded-in wire channels 28 in the body 14 and corresponding channels 28' in the cap 13 (FIG. 14) which together conform to the shape of the wires 23 provide a channel for the wires 23 to emerge from the switch arrangement. V-shaped ridges 41 are arranged perpendicular to the channels 28'. The ridges function as biting elements which press into the wires 23 and secure them while relieving external pressure on the flex circuit 22. As best seen in FIG. 4, the wires 23 are forced to emerge from the housing in a downward direction defining a service loop to prevent dripping water from entering into the switch housing interior.

Figure 11:
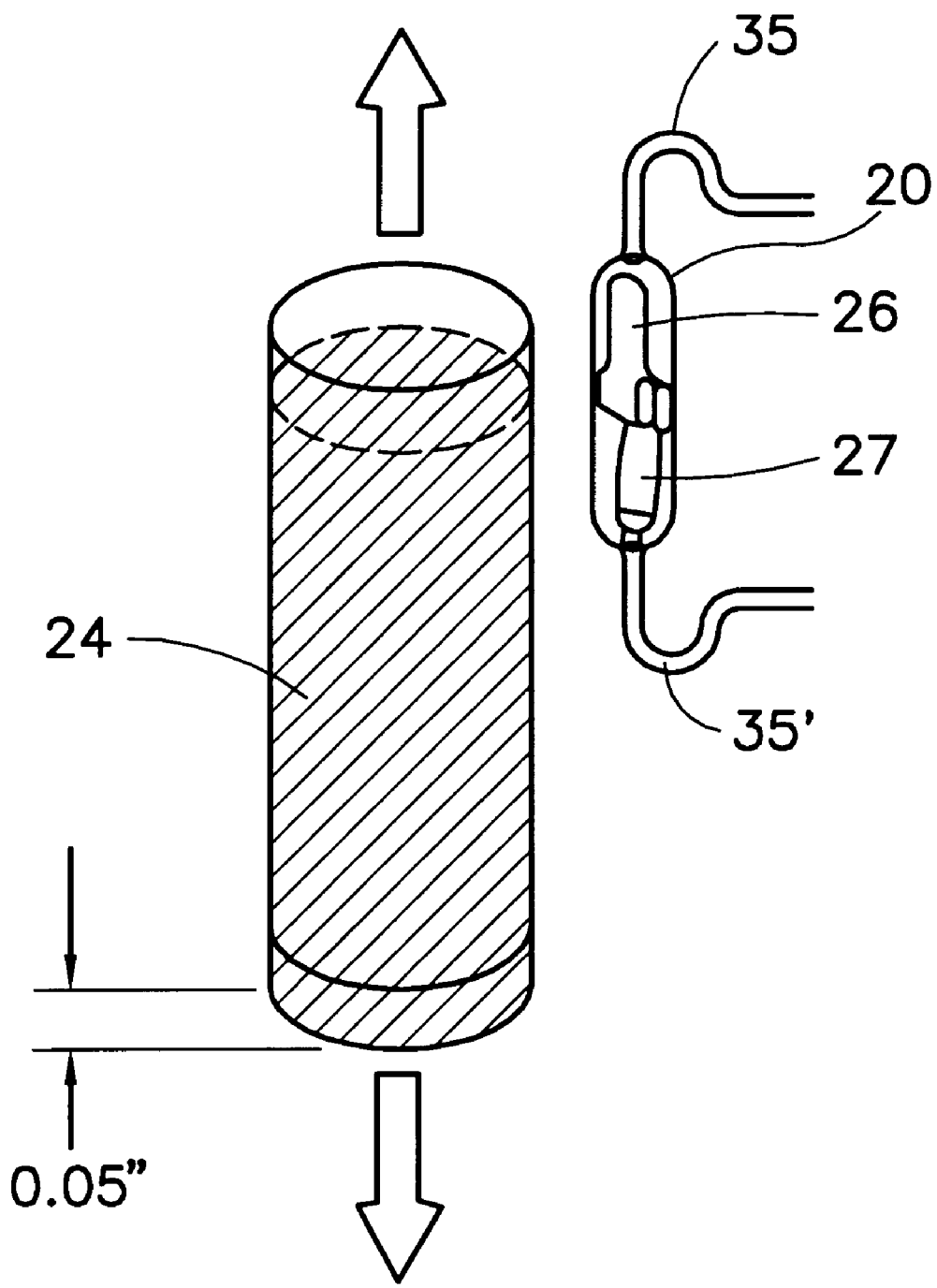
FIG. 11 is an isolated perspective view illustrating the relationship of the cash box switch magnet movement to the opening and closing of the magnetic reed switch contacts.

A magnet 24 constitutes the only moving part of the cash box switch arrangement 12, and is located within the blind bore 18 of the cylindrical portion 17 of the body 14. The magnet 24 can be made of various magnetic materials including, but not limited to, Neodymium rare earth permanent magnet grade 33 or 33H. The distance between the reed switch 20 and the magnet 24 is chosen to minimize hysteresis of the reed switch operation, typically 0.003 inch of magnet travel, while keeping the operating range of the reed switch 20 within a 0.050 inch vertical (up and down) movement of the magnet 24 as shown in FIG. 11.

The cap 13 and body 14 can be molded from Delrin AF (Teflon impregnated) plastic or other material with suitable properties in order to provide a low friction characteristic between the magnet 24 and the bore 18. An important selection criteria for the cap and body material is that the cap and body must remain dimensionally stable over an extended temperature range and also be non-hydroscopic. In this connection, the use of Delrin AF plastic provides an operational temperature range of −40° C. to +85° C.

Figure 6:
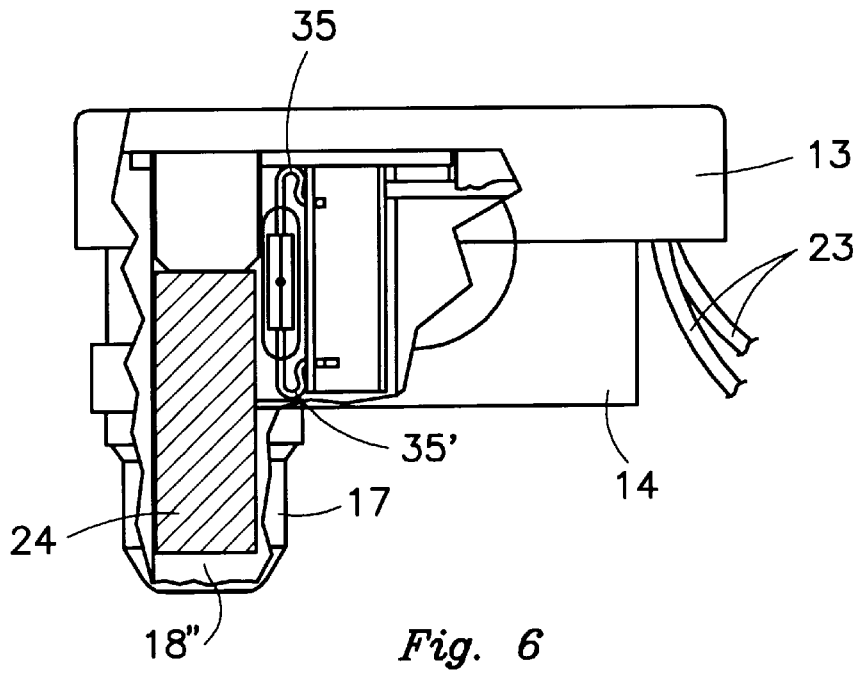
FIG. 6 is a view similar to FIG. 4 but with the magnet in an uppermost position assumed or existing with the cash box removed from the vault and the reed switch contacts closed.

The cap 13 and body 14 are assembled together with elastomeric gasket 16 via a screw 15 after the magnet 24 has been inserted in the bore 18, and the reed switch 20 and electrical leads 23 attached to the flex circuit 22 have been inserted into the respective cavities 19, 21. The entire unit is thereby sealed against dirt and moisture via the compressible molded elastomeric gasket 16. The gasket 16 which can be made from Alcryn or the like also serves to push the top formed lead 35 of the reed switch 20 causing reed switch 20 to be properly positioned at the bottom of the cavity 19 and thereby precisely align the reed switch 20 relative to the magnet 24. The alignment is provided by intimate contact of lower formed lead 35' and floor 14' as shown in FIGS. 4 and 6. The relative locations of floor 14' and the bottom 18" of the blind bore 18 which locates magnet 24 are precisely controlled in the molding process in producing body 14.

Figure 3:
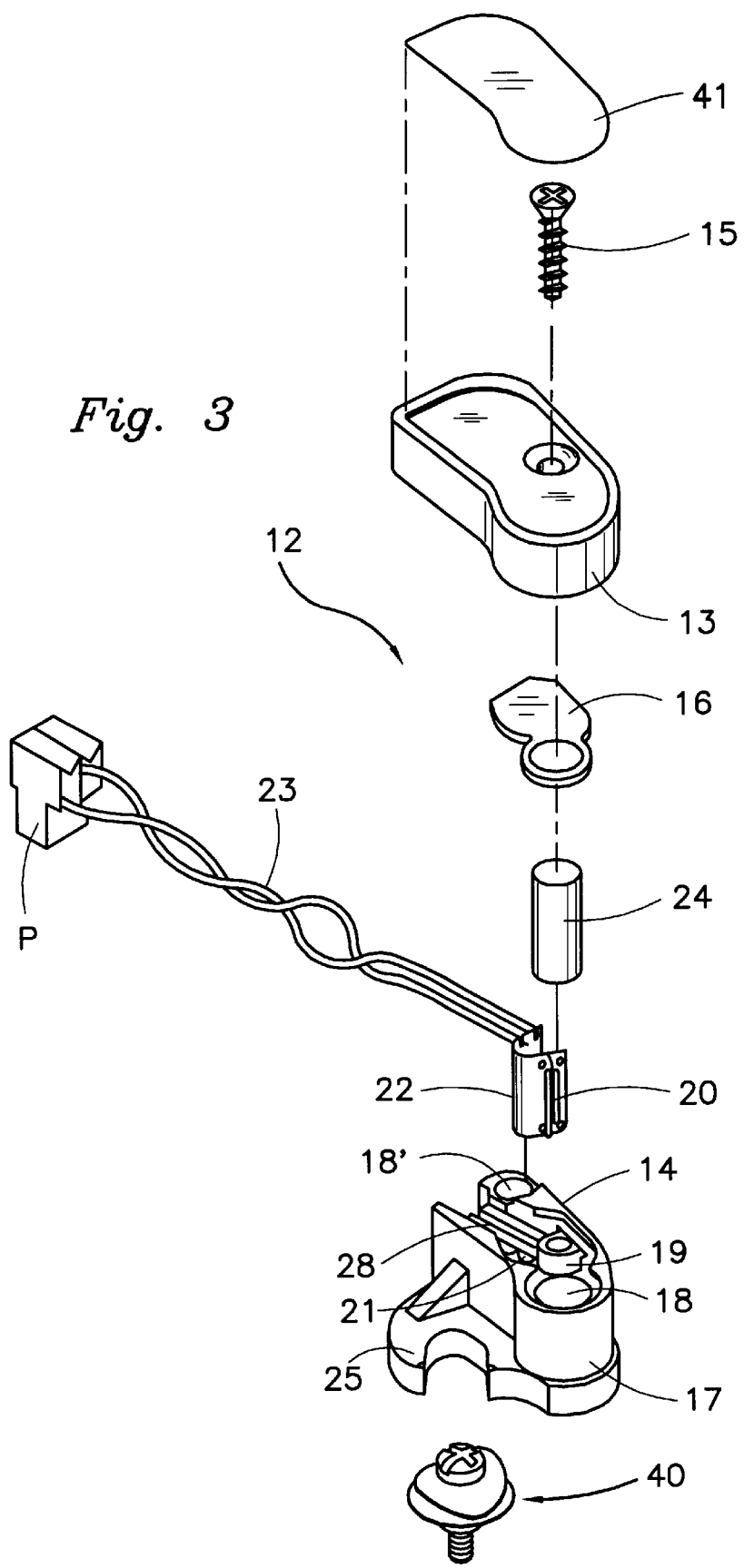
FIG. 3 is an exploded perspective view of the elements of the cash box switch shown in FIG. 2.
Figure 12:
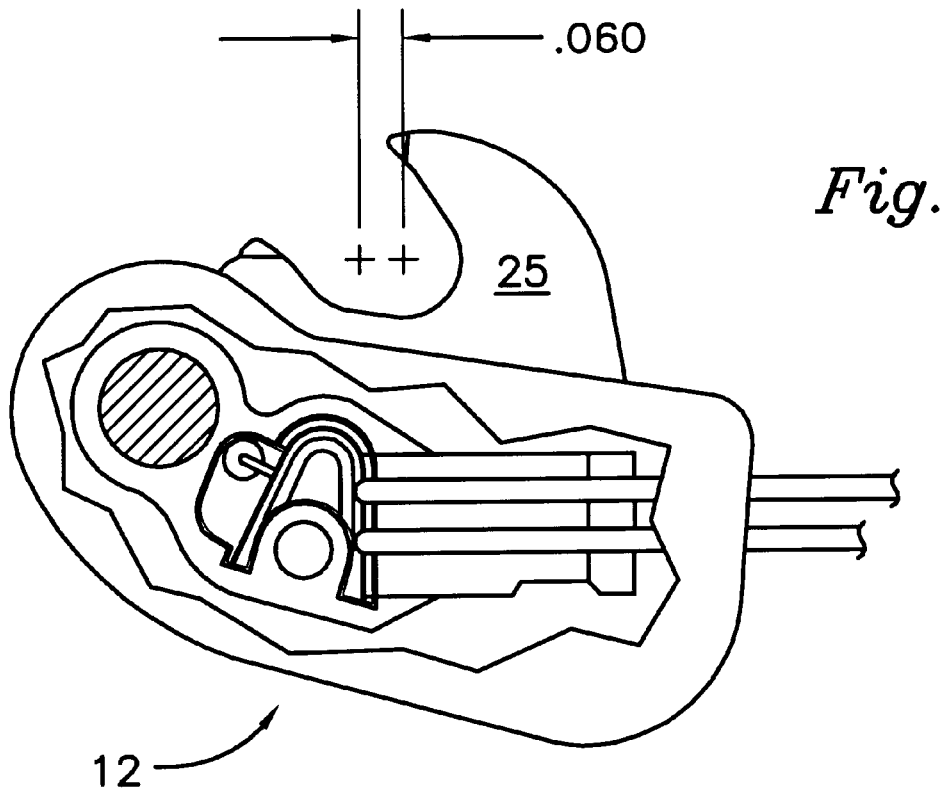
FIG. 12 is a plan view showing the configuration of a hook portion for mounting the cash box switch shown in FIG. 3 in the housing above the vault.
Figure 13:
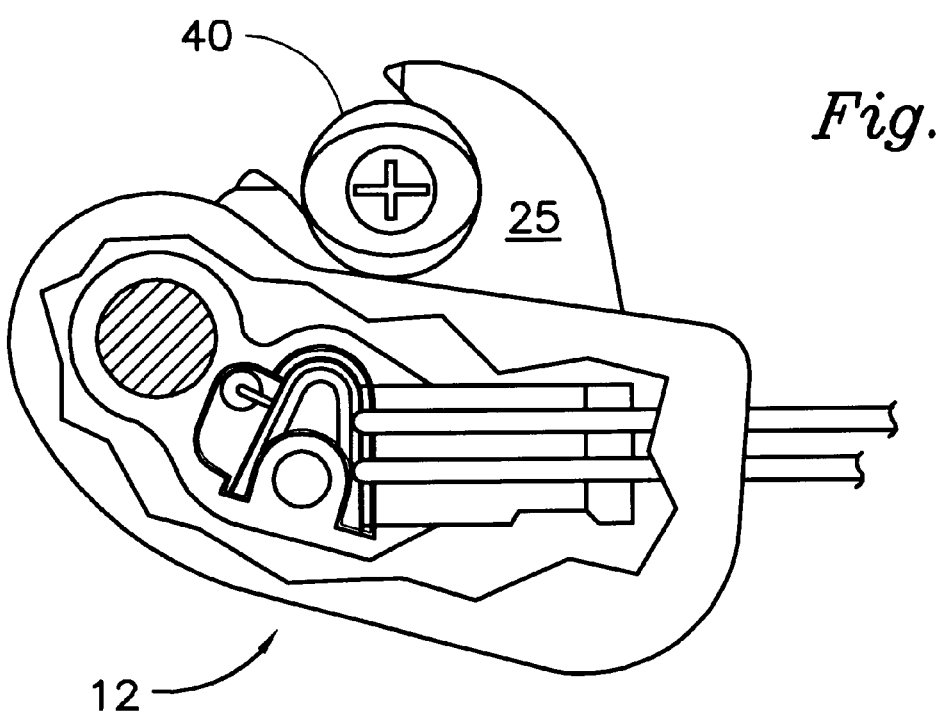
FIG. 13 is a view similar to FIG. 12 but showing the hook with a spring-loaded mounting retainer located in the hook portion.

As can be seen in FIGS. 3, 12 and 13, the cash box switch arrangement 12 is held in place by a mounting hook 25 integral with the body 14. As seen in FIG. 13, the mounting hook 25 is captured under a spring loaded retainer 40 configured to securely retain the switch arrangement 12 in place to prevent the latter from being pushed out of position from the vault area. The mounting hook 25 and the body 14 are configured to compensate for any dimensional variations between the location of the leveling hole and the mounting screw location among the phone housings.

FIG. 12 shows the curved shape of the mounting hook 25 which is configured to provide a tolerance for easy assembly into the phone housing and to compensate, up to 0.060 inch, for the above-mentioned dimensional variations in the location of the leveling hole and the mounting screw location.

Figure 15:
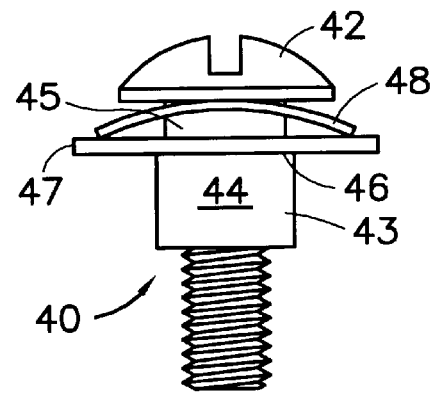
FIG. 15 is an elevational view of the spring-loaded mounting retainer used in FIG. 13.
Figure 7:
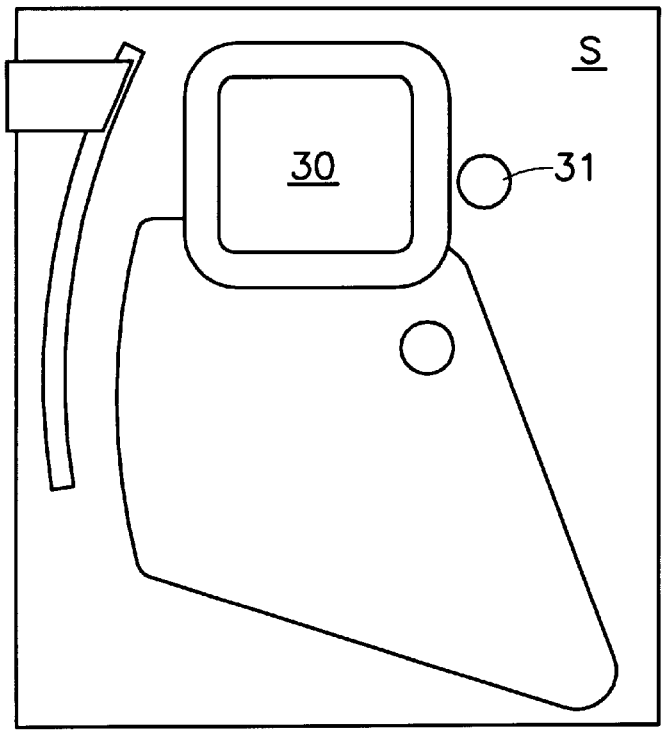
FIG. 7 is a plan view of the cash box lid shown in FIG. 2.

FIG. 15 shows the components of the spring-loaded retainer 40. These components include a double slotted screw 42 and a bushing 43 having a lower portion 44 of slightly less height than that of the hook portion 25 and an upper portion 45 of smaller diameter than the lower portion 44 to define a shoulder 46 therebetween. A flat washer 47 engages the shoulder 46 and the top surface of the hook portion 25. A spring washer 48 between the head of the screw 42 and the washer 47 "loads" the washer 47 securely against the hook portion 25.

FIGS. 4 and 9 show the magnet 24 in its lowermost position when the cash box 11 has been inserted into the vault area V, and the magnet 24 is drawn to its lowermost position by the presence of the ferrous metal top of the cash box 11. The top end (or top pole) of the magnet 24 is thus located in a position in which the magnetic contacts 26, 27 are in their normal open position.

When the cash box 11 is removed from the vault area V as shown in FIGS. 6 and 10, the ferrous metal floor F attracts the magnet into its upward position, thereby closing the magnetic contacts 26, 27 and establishing a complete circuit which is signalled through the lead-out wires 23 and standard plug P to conventional phone electronics (not shown).

As above described, the elastomeric sealing gasket 16 configured to be arranged between the cap 13 and body 14 in FIG. 3 applies pressure, when the housing parts are assembled, to the top formed lead 35 to ensure that the reed switch 20 is properly located in the body 14, i.e. the lower formed lead 35' is in intimate contact with floor 14' in cavity 19 to establish the desired vertical relationship between the reed switch 20 and the magnet 24.

Figure 8:
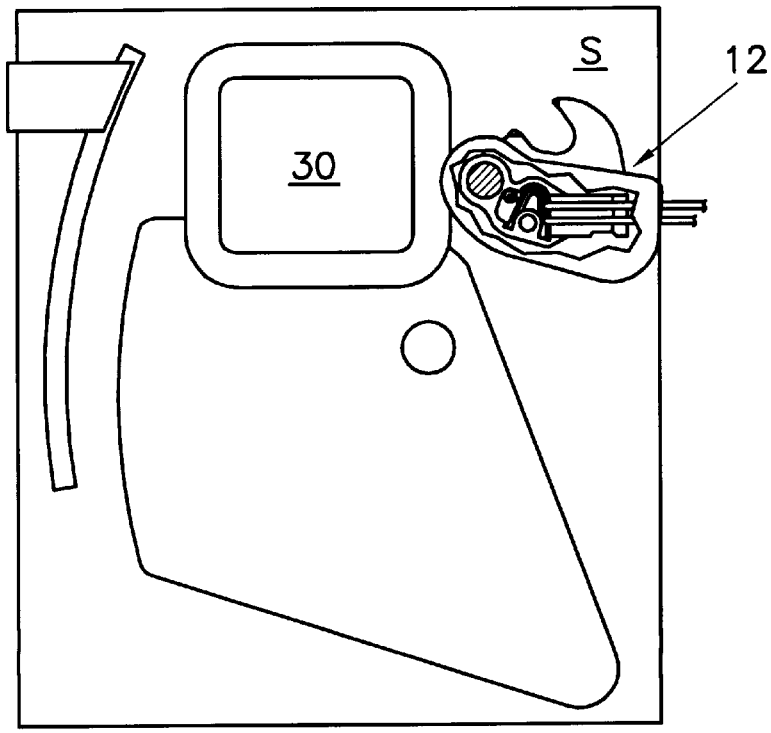
FIG. 8 is a plan view of the cash box of FIG. 7 but in the installed position in the public telephone (not shown) to illustrate the relationship of the cash box switch to the leveling hole in the top of the cash box lid.

Thus, the bi-stable magnetic circuit in accordance with the present invention senses either a solid cash box lid surface (S in FIGS. 8 and 9) or, even with the absence of a solid metal surface, edges of the leveling hole 31 in the standard cash box lid. In either case, the switch arrangement 12 does not require physical contact with the cash box lid due to proximity sensing. The bi-stable magnetic circuit achieves a balance between an attraction to the phone housing floor F without the cash box 11 present in the vault area V and an attraction to the lid of the cash box 11 when the latter is installed in the vault area V. We have been able to accomplish this greatly simplified sensing operation through the use of a well known sealed magnetic glass reed switch 20 for performing the electrical switch function, by recognizing, however, that the mounting of the reed switch 20 relative to the magnet 18 is an important design criterion due to the limited travel of the magnet 24. The distance between the reed switch 20 and the magnet 24 is also important.

The upper end or top pole of the magnet 24 is positioned below the center of the reed switch 20 in the region of the overlap of the contacts 26, 27 as shown in FIG. 4 which occurs when the cash box 11 is present in the vault area. In that case, the contacts 26, 27 of the reed switch 20 are separated and the reed switch is in its normal electrically open condition. When the cash box is removed from the vault area, however, lower end or bottom pole of the magnet 24 is attracted to the phone housing floor F and moves up 0.050 inch as defined by the lower face of the depending part 13' as seen in FIG. 6 causing contacts 26, 27 to close.

We have also recognized that the rotational orientation of the reed switch 20 with respect to the magnet 24 must be carefully controlled because the operating point and hysteresis of the switch will change substantially as a result of the angular positioning of the reed switch leaf contacts 26, 27 relative to the magnet 24. As can be seen in FIG. 4 with the switch arrangement 12 in its normally open condition, a presently preferred configuration of the magnetic reed switch 20 has the upper magnetic contact arm 26 positioned closest to the magnet 24 and the lower magnetic contact 27 furthest away as viewed in FIG. 4.

The horizontal distance between the reed switch 20 and the magnet 24 is selected to minimize the hysteresis of the reed switch operation. In particular, the rotational orientation of the flat portions of the contacts 26, 27 must be kept within ±8° tolerance to maintain the operating point in a known position within 0.005 inch. The influence of other variables including magnet strength and rotational variation, reed switch sensitivity, molding tolerances, reed switch forming tolerances and temperature induced variable must also be taken into account.

The retainer 40 can be made of stainless steel or other suitable non-ferrous material and securely locks the switch arrangement 12 via the mounting hook 25 onto the floor F of the phone housing. The combination consisting of the retainer 40 and the switch arrangement 12 will also tolerate vibration of or impact to the phone housing without upsetting the bi-stable magnetic circuit, and also prevent undesired rotation of the switch arrangement 12 out of place. Due to the location of the switch arrangement 12 in the upper portion of the lower phone housing, tampering with the switch during removal of the cash box is virtually impossible. At the same time, however, the switch arrangement 12 is easily removable if access to the leveling hole 31 in the lid of the cash box 11 is required to level coins there within. The leveling hole 31 and a hole (not shown) in the floor F in alignment with leveling hole 31 are present in all standard 1D-style phone housings.

The switch arrangement 12 can also be adapted to fit in 2D-style panel phone housing. Another advantage of the switch arrangement 12 is that it allows mounting of the switch itself above the vault without requiring the removal of the cash box. The switch can replace any conventional mechanical cash box switch. As above noted, the switch does not require any special electronics as is also the same situation with a standard mechanical switch. This eliminates the need for any power consumption, a special chassis or interface electronics as required with an optical switch and provides that the switch is not affected by the physical condition of the cash box lid, resulting from corrosion, airborne dust or dirt, etc. which could also impair an optical switch.

Although the invention has been described and illustrated in detail, it is to be clearly understood that the same is by way of illustration and example, and is not to be taken by way of limitation. For example, the relationship of the magnet 24 and the reed switch 20 can be changed. The cash box switch can also be implemented using a switching device other than the conventional glass-sealed magnetic reed switch 20. For example, it is within the contemplation of the present invention to provide only electrical contacts in the bore 18 such that the magnet 24 closes an electrical circuit when the magnet arrives at an upper end of its travel. Further, the magnet can be a stationary part so configured and arranged that the presence of the cash box near the bottom pole of the magnet causes flux change of the top pole to operate the contacts of the reed switch. Moreover, the orientation of the switch arrangement 12 can be changed from a horizontal position to a vertical position for detecting other things. Thus, the spirit and scope of the present invention are to be limited only by the terms of the appended claims.

What is claimed is:

1. A cash box switch arrangement for a public telephone, comprising a housing; and a non-contacting magnetic sensing device having a magnet moveably positioned within said housing and having a reed switch mounted on a flexible circuit removably positioned in a predetermined location relative to said magnet within said housing, said sensing device being operatively arranged within the housing to detect the presence or absence of a cash box in the public telephone.

2. The arrangement according to claim 1, wherein the sensing device is configured to utilize one of magnetic flux changes and magnetic flux movement resulting from the presence and absence of the cash box.

3. The cash box switch arrangement according to claim 1, wherein the reed switch has magnetic contacts configured to open or close when the magnet is at an upper limit of travel in the absence of the cash box in the public telephone and to the close or open when the magnet is at a lower limit of travel in the presence of the cash box in the public telephone.

4. In a public telephone, the improvement comprising
   a non-contacting magnetic sensing device having a magnet moveably positioned within said device and having a reed switch mounted on a flexible circuit removably positioned in a predetermined location relative to said magnet within said device, said sensing device being operatively arranged to detect the presence or absence of a cash box in the public telephone; and
   means for removably mounting the device within the public telephone.

5. In the public telephone according to claim 4, wherein the sensing device is configured to utilize magnetic flux changes and magnetic flux movement resulting from the presence and absence of the cash box.

6. In the public telephone according to claim 4, wherein the reed switch has magnetic contacts configured to open or close when the magnet is at an upper limit of travel in the absence of the cash box in the public telephone and to close or open when the magnet is at a lower limit of travel in the presence of the cash box in the public telephone.

7. A payphone cashbox switch arrangement, comprising
   a housing and means in the housing for detecting the presence or absence of a thing responsive to one of magnetic flux movement and magnetic flux change, said means having a magnet moveably mounted within the housing and having a reed switch mounted on a flexible circuit removably positioned in a predetermined location relative to said magnet within the housing.

8. The arrangement according to claim 7, further comprising means for retaining the housing in a predetermined location.

9. The arrangement according to claim 7, wherein the housing has a portion thereof configured to retain the housing in a plurality of different locations.

10. The arrangement according to claim 7, wherein the housing is functionally interchangeable with conventional switch arrangements.

11. The arrangement according to claim 7, wherein said flexible circuit includes resilient legs configured to be securely arranged in a predetermined location in the housing.

12. A method of assembling a payphone cashbox switch arrangement, comprising the steps of
   forming a flexible circuit having a reed switch into a U-shaped part;
   positioning the U-shaped flexible circuit in a cavity of a housing unit; and
   placing a gasket in the housing unit to contact a formed lead of the reed switch associated with the flexible circuit and position the reed switch in a predetermined location in the housing unit relative to an adjacent magnet.

13. The method according to claim 12, further comprising the step of covering the flexible circuit and simultaneously contacting and pressing the gasket into the housing unit.

14. The public telephone according to claim 4, wherein said sensing device includes a housing and wherein the means for removably mounting includes a mounting hook integral with said housing.

15. The public telephone according to claim 14, wherein said mounting hook is configured to securely retain said sensing device and to compensate for dimensional variations within said public telephone.

* * * * *